(12) United States Patent
Li et al.

(10) Patent No.: US 10,681,714 B2
(45) Date of Patent: Jun. 9, 2020

(54) METHOD AND DEVICE FOR TRANSMISSION INSTRUCTION, TRANSMISSION TRIGGERING, AND TRANSMISSION IMPLEMENTATION FOR MULTI-STATION

(71) Applicant: ZTE CORPORATION, Guangdong (CN)

(72) Inventors: Nan Li, Guangdong (CN); Kaiying Lv, Guangdong (CN); Weimin Xing, Guangdong (CN); Dan Yang, Guangdong (CN); Bo Sun, Guangdong (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 15/742,736

(22) PCT Filed: May 4, 2016

(86) PCT No.: PCT/CN2016/081005
§ 371 (c)(1),
(2) Date: Jan. 8, 2018

(87) PCT Pub. No.: WO2017/005040
PCT Pub. Date: Jan. 12, 2017

(65) Prior Publication Data
US 2018/0220437 A1    Aug. 2, 2018

(30) Foreign Application Priority Data

Jul. 9, 2015 (CN) .......................... 2015 1 0400899

(51) Int. Cl.
*H04W 72/12* (2009.01)
*H04W 74/08* (2009.01)
(Continued)

(52) U.S. Cl.
CPC ..... *H04W 72/121* (2013.01); *H04W 72/1236* (2013.01); *H04W 72/1268* (2013.01);
(Continued)

(58) Field of Classification Search
None
See application file for complete search history.

(56) References Cited

U.S. PATENT DOCUMENTS 6,785,252 B1 * 8/2004 Zimmerman ......... H04W 72/10
370/337
7,230,931 B2 * 6/2007 Struhsaker ........... H04B 7/0617
370/280

(Continued)

FOREIGN PATENT DOCUMENTS

CN    102468946 A    5/2012
CN    104039013 A    9/2014
(Continued)

OTHER PUBLICATIONS

Ahn W. et al., "UL-OFDMA Procedure in IEEE", vol. 802.11ax, vol. 82.11ax, No. 1, pp. 1-20 (Jan. 13, 2015).
(Continued)

*Primary Examiner* — Gregory B Sefcheck
(74) *Attorney, Agent, or Firm* — Knobbe, Martens, Olson & Bear, LLP

(57) ABSTRACT

A method and device for transmission instruction, transmission triggering and transmission implementation for multi-station. A first station sends a radio frame carrying instruction information on a contended channel with a bandwidth being a first bandwidth to an access point, and the instruction information being used for instructing the access point to trigger the first station, or, trigger the first station and one or more other stations to perform uplink transmission.

21 Claims, 5 Drawing Sheets

(51) Int. Cl.
*H04W 84/12* (2009.01)
*H04B 7/0452* (2017.01)
*H04W 74/00* (2009.01)

(52) U.S. Cl.
CPC ... *H04W 72/1284* (2013.01); *H04W 72/1289* (2013.01); *H04W 74/002* (2013.01); *H04W 74/0808* (2013.01); *H04W 74/0833* (2013.01); *H04B 7/0452* (2013.01); *H04W 84/12* (2013.01)

(56) References Cited

U.S. PATENT DOCUMENTS

| | | | | |
|---|---|---|---|---|
| 7,433,670 | B2* | 10/2008 | Benveniste | H04W 48/08 455/343.2 |
| 7,529,193 | B2* | 5/2009 | Zimmerman | H04Q 11/0478 370/252 |
| 7,668,130 | B2* | 2/2010 | Jang | H04L 1/0025 370/311 |
| 7,899,396 | B2* | 3/2011 | Meylan | H04W 16/14 455/41.2 |
| 7,937,090 | B2* | 5/2011 | Bourlas | H04W 72/1289 455/452.1 |
| 8,027,298 | B2* | 9/2011 | Stanwood | H04W 72/10 370/329 |
| 8,068,476 | B2* | 11/2011 | Jang | H04L 1/0025 370/347 |
| 8,199,712 | B2* | 6/2012 | Qu | H04L 5/0007 370/329 |
| 8,457,145 | B2* | 6/2013 | Zimmerman | H04Q 11/0478 370/412 |
| 8,619,725 | B2* | 12/2013 | Ode | H04B 7/024 370/331 |
| 8,638,732 | B2* | 1/2014 | Lim | H04L 1/0025 370/232 |
| 9,019,903 | B2* | 4/2015 | Palanki | H04J 11/0053 370/329 |
| 9,154,194 | B2* | 10/2015 | Koivisto | H04B 7/024 |
| 9,288,091 | B2* | 3/2016 | Seol | H04L 1/18 |
| 9,306,720 | B2* | 4/2016 | Takeda | H04L 1/0027 |
| 9,374,716 | B2* | 6/2016 | Enescu | H04W 24/02 |
| 9,467,890 | B2* | 10/2016 | Choi | H04W 4/70 |
| 9,762,363 | B2* | 9/2017 | Won | H04B 7/022 |
| 9,769,758 | B2* | 9/2017 | Kim | H04W 74/06 |
| 9,860,808 | B2* | 1/2018 | Xiao | H04W 36/04 |
| 9,930,695 | B2* | 3/2018 | Stacey | H04W 74/0833 |
| 10,143,005 | B2* | 11/2018 | Chendamarai Kannan | H04L 5/14 |
| 10,159,060 | B2* | 12/2018 | Cariou | H04W 72/04 |
| 2006/0291430 | A1* | 12/2006 | Putzolu | H04W 28/20 370/335 |
| 2012/0327882 | A1* | 12/2012 | Park | H04B 7/0632 370/329 |
| 2013/0279363 | A1* | 10/2013 | Huang | H04L 5/001 370/252 |
| 2013/0301502 | A1* | 11/2013 | Kwon | H04W 52/0206 370/311 |
| 2015/0146654 | A1 | 5/2015 | Chu et al. | |

FOREIGN PATENT DOCUMENTS

| | | |
|---|---|---|
| CN | 104253673 A | 12/2014 |
| CN | 105101435 A | 11/2015 |
| WO | WO 2015/031464 A1 | 3/2015 |

OTHER PUBLICATIONS

Ahn W. et al., "Multi-Channel Availability for UL-OFDMA", vol. 802.11ax, No. 1, pp. 1-16 (May 12, 2015).
Chun J. et al., "Consideration on UL MU Transmission", vol. 802.11ax, pp. 1-10 (Jul. 14, 2014).
Ghosh C. et al., "Random Access With Trigger Frames Using OFDMA", vol. 802.11ax, pp. 1-16 (May 11, 2015).
Kwon Y H et al., "Issues on UL-OFDMA Transmission", vol. 802.11ax, pp. 1-19 (Nov. 3, 2014).
European Extended Supplementary Search Report dated May 30, 2018 received in European Patent Application No. 16 82 0691.0.
International Search Report dated Jul. 21, 2016 issued in PCT/CN2016/081005.

* cited by examiner

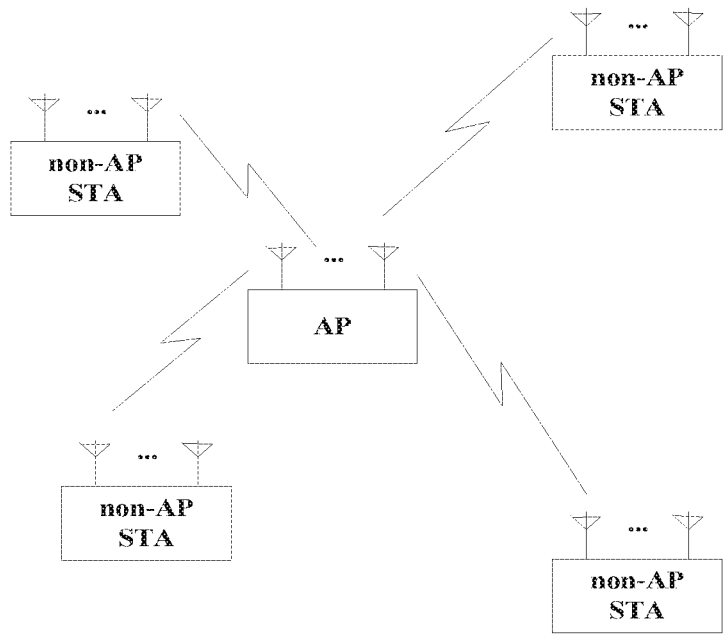

Fig. 1

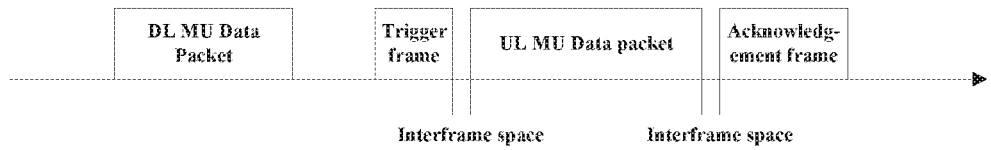

Fig. 2

A first station sends a radio frame carrying instruction information on a contended channel with a bandwidth being a first bandwidth to an access point, wherein, the instruction information is used for instructing the access point to trigger the first station, or, trigger the first station and one or more other stations to perform uplink transmission, and the instruction information comprises at least one of: information for instructing whether to allow the access point to trigger the first station and one or more other stations to perform uplink transmission; information concerning the size of bandwidth resources that need to be occupied by the first station for subsequent uplink transmission; information concerning the location of bandwidth resources that need to be occupied by the first station for subsequent uplink transmission; and quality of service (QoS) parameter information of the first station ⎯ S302

Fig. 3

METHOD AND DEVICE FOR TRANSMISSION INSTRUCTION, TRANSMISSION TRIGGERING, AND TRANSMISSION IMPLEMENTATION FOR MULTI-STATION

CROSS REFERENCE TO RELATED APPLICATION

The present application is the national phase of International Application No. PCT/CN2016/081005, filed on May 4, 2016 and claims priority to Chinese Patent Application No. CN201510400899.0, filed on Jul. 9, 2015, and the entire contents thereof are incorporated herein by reference.

TECHNICAL FIELD

The embodiments of the present disclosure relate to but are not limited to, a multi-station transmission instruction, triggering, and execution method and device.

BACKGROUND

At present, as more users are using wireless local area network (WLAN) for data communications, the load of the WLAN networks is increasing, and as the number of users is increasing, the efficiency of the WLAN networks is also tending to decline significantly. Taking measures to merely increase the rate thereof cannot solve the abovementioned problems. Multi-station parallel transmission, as an alternative technology to improve network efficiency, has aroused extensive attentions and researches. In the related art, multi-station parallel transmission technologies may comprise, but are not limited to, Multi-User Multiple-Input Multiple-Output (MU-MIMO) technology (i.e., spatial domain multiple access), Orthogonal Frequency Division Multiple Access (OFDMA) technology (i.e., frequency domain multiple access).

FIG. 1 is a schematic diagram of a WLAN basic service set according to the related art. As shown in FIG. 1, in a WLAN, an access point station (AP STA) and a plurality of non-AP stations (non-AP STAs) associated with the AP form a basic service set (BSS).

In order to solve hidden station problems, 802.11 has proposed a virtual channel detection mechanism: when station 1 sends a frame, the frame it sends may carry a time domain) to indicate the length of time required by the station to complete the frame exchange. Station 2 receives the frame sent by station 1 and returns a response frame, wherein the response frame also carries a time domain to ensure that station 1 can complete the frame exchange. Other listening stations that have heard the frame exchange may configure a network allocation vector (NAV), and the value of the NAV may be configured to be the maximum value in the abovementioned time domain. During this time, the listening stations will not send data, thus avoiding collisions caused by hidden nodes contending for channels. Other stations can send data only after the NAV is decreased to zero.

FIG. 2 is a schematic diagram of multi-station transmission frame exchange according to the related art. As shown in FIG. 2, the multi-station parallel transmission in a WLAN usually shows multiple non-AP STAs simultaneously send data to an AP, which is generally referred to as an uplink multi-user (UL MU) transmission, or the AP sends data to multiple non-AP STAs simultaneously, which is referred to as a downlink multi-user (DL MU) transmission. FIG. 2 shows a typical uplink and downlink multi-station transmission frame exchange sequence.

In the technical solution provided in the related art, a UL MU transmission needs an AP to trigger, for example, by sending a trigger frame to trigger, or by means of a radio frame carrying a trigger information domain to trigger. The trigger frame or trigger information domain carries the scheduling information of the station, for example, the identification information of the station, time and frequency resource information used by the station for uplink transmission, time-frequency offset calibration information of the station, and the like. After the AP has sent the trigger frame or trigger information domain, the station receives the trigger frame or trigger information domain, if its own identification information is carried therein, which indicates that it itself is scheduled in this UL MU transmission, and if it itself has data to send, it may prepare and synchronize according to the time-frequency offset calibration information indicated by the AP, to send the data on the allocated time and frequency resources.

The multi-station transmission allows for multi-station parallel transmission, thereby saving the time for which the air interface is occupied. In a network user-intensive scenario, network collisions can be reduced and air interface efficiency can be improved. Future WLAN communication systems can support continuous and non-continuous bandwidth distribution of 20 MHz/40 MHz/80 MHz/160 MHz. If some station obtains certain channel resources by contention but the station itself occupies only a part of the channel resources for transmission, as all the bandwidth resources obtained by contention have been claimed by the station for occupation, other stations are unable to contend for occupation. However, the problem is that the station does not actually occupy all the resources, and thereby causes the waste of frequency resources. The related art has not provided an effective solution to the abovementioned technical problems.

This section provides background information related to the present disclosure which is not necessarily prior art.

SUMMARY

The following is an overview of the topics described in detail in this article. This overview is not intended to limit the protection scope of the claims.

Provided in the embodiments of the present disclosure are a multi-station transmission instruction, triggering and execution method and device, so as to at least solve the problem in the related art that if some station obtains certain channel resources by contention but the station itself occupies only a part of the channel resources for transmission, as all the bandwidth resources obtained by contention have been claimed by the station for occupation, other stations are unable to contend for occupation, resulting in the waste of frequency resources.

According to an aspect of the embodiments of the present disclosure, there is provided a multi-station transmission instruction method, comprising:

A first station sending a radio frame carrying instruction information on a contended channel with a first bandwidth to an access point, wherein the instruction information is used for instructing the access point to trigger the first station, or, trigger the first station and one or more other stations to perform uplink transmission, and the instruction information comprises at least one of: information for instructing whether to allow the access point to trigger the first station and one or more other stations to perform uplink transmission; information concerning the size of bandwidth resources that need to be occupied by the first station for subsequent uplink transmission; information concerning the position of bandwidth resources that need to be occupied by the first station for subsequent uplink transmission; and quality of service (QoS) parameter information of the first station.

Alternatively, after the first station sends the radio frame carrying instruction information to the access point, the method further comprises: the first station receiving the radio frame carrying trigger information sent by the access point, wherein the radio frame carrying the trigger information is used for indicating the channel allocated by the access point to the first station; and the first station performs uplink transmission on the channel allocated by the access point to the first station.

Alternatively, before the first station sends the radio frame, the method further comprises: the first station performing channel detection, and selecting, according to the channel sense result, the position of bandwidth resources that need to be occupied for subsequent uplink transmission.

Alternatively, the information concerning the size of bandwidth resources is used for indicating a first part of the first bandwidth; and/or the information concerning the position of bandwidth resources is used for indicating the position of a channel with a bandwidth being the first part of the first bandwidth.

Alternatively, the position of bandwidth resources is continuous or non-continuous in frequency band.

Alternatively, the length of time, during which the first station or the first station and one or more other stations perform uplink transmission, is less than or equal to the length of the transmission time that the first station has contended for.

Alternatively, the QoS parameter information comprises at least one of: data buffer status information of the first station; maximum or minimum length information of a data packet that is allowed to be transmitted by the first station; a minimum guaranteed bit rate of the first station; minimum modulation and coding scheme (MCS) rate requirements of the first station.

According to another aspect of the embodiments of the present disclosure, there is provided a multi-station transmission triggering method, comprising:

An access point receiving a radio frame carrying instruction information sent by a first station on a contended channel with a first bandwidth; the access point triggering the first station to perform uplink transmission according to the instruction information, or triggering the first station and one or more other stations to perform uplink transmission.

Alternatively, the instruction information comprises at least one of: information for instructing whether to allow the access point to trigger the first station and one or more other stations to perform uplink transmission; information concerning the size of bandwidth resources that need to be occupied by the first station for subsequent uplink transmission; information concerning the position of bandwidth resources that need to be occupied by the first station for subsequent uplink transmission; and quality of service (QoS) parameter information of the first station.

Alternatively, the QoS parameter information comprises at least one of: data buffer status information of the first station; maximum or minimum length information of a data packet that is allowed to be transmitted by the first station; a minimum guaranteed bit rate of the first station; minimum MCS rate requirements of the first station.

Alternatively, before the access point triggers the first station to perform uplink transmission according to the instruction information, or triggers the first station and one or more other stations to perform uplink transmission, the method further comprises one of the following operations: the access point performing channel detection and selecting, according to the channel sense result, a bandwidth size and/or a bandwidth resource location for uplink transmission of the first station; and the access point performing channel detection and selecting, according to the channel sense result, a bandwidth size and/or a bandwidth resource location for the first station and one or more other stations to perform uplink transmission.

Alternatively, by sending the radio frame carrying the trigger information according to the instruction information, the access point triggers the first station to perform uplink transmission, or triggers the first station and one or more other stations to perform uplink transmission, wherein the transmission bandwidth of the radio frame carrying the trigger information is greater than, equal to or less than the first bandwidth.

Alternatively, when the instruction information carries information of whether to allow the access point to trigger the first station and one or more other stations to perform uplink transmission and the information indicates that the access point is allowed, the access point triggers the first station and one or more other stations to perform uplink transmission; if the information indicates that the access point is not allowed, the access point allocates, according to the parameter information set of the sending first station, a bandwidth size and/or a bandwidth resource location to the first station for uplink transmission, wherein the parameter information set comprises at least one of: bandwidth resource size, bandwidth resource location, QoS parameter information.

Alternatively, when the instruction information carries information of whether to allow the access point to trigger the first station and one or more other stations to perform uplink transmission, if the information indicates that the access point is not allowed and the instruction information does not carry the parameter information set of the first station, the access point allocates, according to the channel sense result, a bandwidth size and/or a bandwidth resource location to the first station for uplink transmission, wherein the parameter information set comprises at least one of: bandwidth resource size, bandwidth resource location, QoS parameter information.

Alternatively, the access point selects a bandwidth size and/or a bandwidth resource location for the first station according to the signal detection result of the radio frame carrying the instruction information.

Alternatively, when the instruction information does not carry the information of whether to allow the access point to trigger the first station and one or more other stations to perform uplink transmission, the access point triggers the first station and one or more other stations to perform uplink transmission.

Alternatively, when the instruction information carries the information concerning the size of bandwidth resources that need to be occupied by the first station for subsequent uplink transmission, the access point allocates at least the transmission bandwidth corresponding to the bandwidth resource size information to the first station.

Alternatively, when the instruction information carries the information concerning the position of bandwidth resources that need to be occupied by the first station for subsequent uplink transmission, the access point allocates at least bandwidth resources corresponding to the bandwidth resource location information to the first station.

Alternatively, when the QoS parameter information comprises at least one of data buffer status information of a station, maximum or minimum length information of a data packet that is allowed to be transmitted by the station, a minimum guaranteed bit rate of the station, and minimum modulation and coding scheme (MCS) rate requirements of the station, the access point allocates, according to the QoS parameter information, a bandwidth size and/or a bandwidth resource location to the first station for uplink transmission.

Alternatively, the channel allocated by the access point to the first station is continuous or non-continuous in frequency band.

Alternatively, the length of time, during which the first station or the first station and one or more other stations perform uplink transmission, is less than or equal to the length of the transmission time that the first station has contended for.

According to still another aspect of the embodiments of the present disclosure, there is provided a multi-station transmission execution method, comprising:

One or more stations receiving a radio frame carrying trigger information sent by an access point, the radio frame carrying the trigger information being used for triggering the one or more stations to perform uplink transmission, wherein the one or more stations are stations other than the first station; the one or more stations ignoring the network allocation vector (NAV) configured by the first station and performing uplink transmission according to the radio frame.

Alternatively, if the one or more stations, for which the first station has configured the NAV, obtain random access resource information, and are allowed to access on the random access resources, the one or more stations ignore the NAV configured by the first station and contend for access on the random access resources.

According to yet another aspect of the embodiments of the present disclosure, there is provided a multi-station transmission instruction device, the device being applied to a station and comprising:

A sending module, configured to send a radio frame carrying instruction information on a contended channel with a bandwidth being a first bandwidth to an access point, wherein the instruction information is used for instructing the access point to trigger the first station or trigger the first station and one or more other stations to perform uplink transmission, and the instruction information comprises at least one of: information for instructing whether to allow the access point to trigger the first station and one or more other stations to perform uplink transmission; information concerning the size of bandwidth resources that need to be occupied by the first station for subsequent uplink transmission; information concerning the position of bandwidth resources that need to be occupied by the first station for subsequent uplink transmission; and QoS parameter information of the first station.

Alternatively, the abovementioned device further comprises: a receiving module, configured to receive a radio frame carrying trigger information sent by the access point, wherein the radio frame carrying the trigger information is used for indicating the channel allocated by the access point to the first station; and a transmission module, configured to perform uplink transmission on the channel allocated by the access point to the first station.

Alternatively, the device further comprises: a selection module, configured to perform channel detection, and select, according to the channel sense result, the position of bandwidth resources that need to be occupied for subsequent uplink transmission.

Alternatively, the information concerning the size of bandwidth resources is used for indicating a first part of the first bandwidth; and/or the information concerning the position of bandwidth resources is used for indicating the position of a channel with a bandwidth being the first part of the first bandwidth.

Alternatively, the position of bandwidth resources is continuous or non-continuous in frequency band.

Alternatively, the length of time, during which the first station or the first station and one or more other stations perform uplink transmission, is less than or equal to the length of the transmission time that the first station has contended for.

Alternatively, the QoS parameter information comprises at least one of: data buffer status information of the first station; maximum or minimum length information of a data packet that is allowed to be transmitted by the first station; a minimum guaranteed bit rate of the first station; minimum MCS rate requirements of the first station.

According to yet another aspect of the embodiments of the present disclosure, there is provided a multi-station transmission triggering device, the device being applied to an access point and comprising:

A receiving module, configured to receive a radio frame carrying instruction information sent by a first station on a contended channel with a bandwidth being the first bandwidth; and a triggering module, configured to, according to the instruction information, trigger the first station to perform uplink transmission, or trigger the first station and one or more other stations to perform uplink transmission.

Alternatively, the instruction information comprises at least one of: information for instructing whether to allow the access point to trigger the first station and one or more other stations to perform uplink transmission; information concerning the size of bandwidth resources that need to be occupied by the first station for subsequent uplink transmission; information concerning the position of bandwidth resources that need to be occupied by the first station for subsequent uplink transmission; and quality of service (QoS) parameter information of the first station.

Alternatively, the QoS parameter information comprises at least one of: data buffer status information of the first station; maximum or minimum length information of a data packet that is allowed to be transmitted by the first station; a minimum guaranteed bit rate of the first station; minimum MCS rate requirements of the first station.

Alternatively, the device further comprises: a selection module, configured to perform channel detection, and perform one of the following operations according to the channel sense result: select, according to the channel sense result, a bandwidth size and/or a bandwidth resource location for uplink transmission of the first station; and select, according to the channel sense result, a bandwidth size and/or a bandwidth resource location for the first station and one or more other stations to perform uplink transmission.

Alternatively, the triggering module is configured to, by sending the radio frame carrying the trigger information according to the instruction information, trigger the first station to perform uplink transmission, or trigger the first station and one or more other stations to perform uplink transmission, wherein the transmission bandwidth of the radio frame carrying the trigger information is greater than, equal to or less than the first bandwidth.

Alternatively, the triggering module is configured to, when the instruction information carries information of whether to allow the access point to trigger the first station and one or more other stations to perform uplink transmission and the information indicates that the access point is allowed, trigger the first station and one or more other stations to perform uplink transmission, and if the information indicates that the access point is not allowed, allocate, according to the parameter information set of the sending first station, a bandwidth size and/or a bandwidth resource location to the first station for uplink transmission, wherein the parameter information set comprises at least one of: bandwidth resource size, bandwidth resource location, QoS parameter information.

Alternatively, the triggering module is configured to, when the instruction information carries information of whether to allow the access point to trigger the first station and one or more other stations to perform uplink transmission, if the information indicates that the access point is not allowed and the instruction information does not carry the parameter information set of the first station, allocate, according to the channel sense result, a bandwidth size and/or a bandwidth resource location to the first station for uplink transmission, wherein the parameter information set comprises at least one of: bandwidth resource size, bandwidth resource location, QoS parameter information.

Alternatively, the triggering module is configured to select a bandwidth size and/or a bandwidth resource location for the first station according to the signal detection result of the radio frame carrying the instruction information.

Alternatively, the triggering module is configured to, when the instruction information does not carry information of whether to allow the access point to trigger the first station and one or more other stations to perform uplink transmission, trigger the first station and one or more other stations to perform uplink transmission.

Alternatively, the triggering module is configured to, when the instruction information carries the information concerning the size of bandwidth resources that need to be occupied by the first station for subsequent uplink transmission, allocate at least the transmission bandwidth corresponding to the bandwidth resource size information to the first station.

Alternatively, the triggering module is configured to, when the instruction information carries the information concerning the position of bandwidth resources that need to be occupied by the first station for subsequent uplink transmission, allocate at least bandwidth resources corresponding to the bandwidth resource location information to the first station.

Alternatively, the triggering module is configured to, when the QoS parameter information comprises at least one of data buffer status information of a station, maximum or minimum length information of a data packet that is allowed to be transmitted by the station, a minimum guaranteed bit rate of the station, and minimum modulation and coding scheme (MCS) rate requirements of the station, allocate a bandwidth size and/or a bandwidth resource location to the first station for uplink transmission according to the QoS parameter information.

Alternatively, the channel allocated by the access point to the first station is continuous or non-continuous in frequency band.

Alternatively, the length of time, during which the first station or the first station and one or more other stations perform uplink transmission, is less than or equal to the length of the transmission time that the first station has contended for.

According to still another aspect of the embodiments of the present disclosure, there is provided a multi-station transmission execution device, the device being applied to one or more stations and comprising:

A receiving module, configured to receive a radio frame carrying trigger information sent by an access point, the radio frame carrying the trigger information being used for triggering the one or more stations to perform uplink transmission, wherein the one or more stations are stations other than a first station; an execution module, configured to ignore the NAV configured by the first station and perform uplink transmission according to the radio frame.

Alternatively, the execution module is configured to, if the one or more stations, for which the first station configures the NAV, obtain random access resource information and are allowed to access on the random access resources, ignore the NAV configured by the first station and contend for access on the random access resources.

According to yet another aspect of the embodiments of the present disclosure, there is provided a multi-station transmission instruction device, the device being applied to a station and comprising: a processor; and a memory configured to store instructions executable by the processor; wherein the processor is configured to: send a radio frame carrying instruction information on a contended channel with a bandwidth being a first bandwidth to an access point, wherein the instruction information is used for instructing the access point to trigger the first station or trigger the first station and one or more other stations to perform uplink transmission, and the instruction information comprises at least one of: information for instructing whether to allow the access point to trigger the first station and one or more other stations to perform uplink transmission; information concerning the size of bandwidth resources that need to be occupied by the first station for subsequent uplink transmission; information concerning the position of bandwidth resources that need to be occupied by the first station for subsequent uplink transmission; and QoS parameter information of the first station.

Alternatively, the processor is further configured to receive a radio frame carrying trigger information sent by the access point, wherein the radio frame carrying the trigger information is used for indicating the channel allocated by the access point to the first station; and perform uplink transmission on the channel allocated by the access point to the first station.

Alternatively, the processor is further configured to perform channel detection, and select, according to the channel sense result, the position of bandwidth resources that need to be occupied for subsequent uplink transmission.

Alternatively, the information concerning the size of bandwidth resources is used for indicating a first part of the first bandwidth; and/or the information concerning the position of bandwidth resources is used for indicating the position of a channel with a bandwidth being the first part of the first bandwidth.

Alternatively, the position of bandwidth resources is continuous or non-continuous in frequency band.

Alternatively, the length of time, during which the first station or the first station and one or more other stations perform uplink transmission, is less than or equal to the length of the transmission time that the first station has contended for.

Alternatively, the QoS parameter information comprises at least one of: data buffer status information of the first station; maximum or minimum length information of a data packet that is allowed to be transmitted by the first station; a minimum guaranteed bit rate of the first station; minimum MCS rate requirements of the first station.

According to yet another aspect of the embodiments of the present disclosure, there is provided a multi-station transmission triggering device, the device being applied to an access point and comprising: a processor; and a memory configured to store instructions executable by the processor; wherein the processor is configured to: receive a radio frame carrying instruction information sent by a first station on a contended channel with a bandwidth being the first bandwidth; and according to the instruction information, trigger the first station to perform uplink transmission, or trigger the first station and one or more other stations to perform uplink transmission.

Alternatively, the instruction information comprises at least one of: information for instructing whether to allow the access point to trigger the first station and one or more other stations to perform uplink transmission; information concerning the size of bandwidth resources that need to be occupied by the first station for subsequent uplink transmission; information concerning the position of bandwidth resources that need to be occupied by the first station for subsequent uplink transmission; and quality of service (QoS) parameter information of the first station.

Alternatively, the QoS parameter information comprises at least one of: data buffer status information of the first station; maximum or minimum length information of a data packet that is allowed to be transmitted by the first station; a minimum guaranteed bit rate of the first station; minimum MCS rate requirements of the first station.

Alternatively, the processor is further configured to perform channel detection, and perform one of the following operations according to the channel sense result: select, according to the channel sense result, a bandwidth size and/or a bandwidth resource location for uplink transmission of the first station; and select, according to the channel sense result, a bandwidth size and/or a bandwidth resource location for the first station and one or more other stations to perform uplink transmission.

Alternatively, the processor is configured to, by sending the radio frame carrying the trigger information according to the instruction information, trigger the first station to perform uplink transmission, or trigger the first station and one or more other stations to perform uplink transmission, wherein the transmission bandwidth of the radio frame carrying the trigger information is greater than, equal to or less than the first bandwidth.

Alternatively, the processor is configured to, when the instruction information carries information of whether to allow the access point to trigger the first station and one or more other stations to perform uplink transmission and the information indicates that the access point is allowed, trigger the first station and one or more other stations to perform uplink transmission, and if the information indicates that the access point is not allowed, allocate, according to the parameter information set of the sending first station, a bandwidth size and/or a bandwidth resource location to the first station for uplink transmission, wherein the parameter information set comprises at least one of: bandwidth resource size, bandwidth resource location, QoS parameter information.

Alternatively, the processor is configured to, when the instruction information carries information of whether to allow the access point to trigger the first station and one or more other stations to perform uplink transmission, if the information indicates that the access point is not allowed and the instruction information does not carry the parameter information set of the first station, allocate, according to the channel sense result, a bandwidth size and/or a bandwidth resource location to the first station for uplink transmission, wherein the parameter information set comprises at least one of: bandwidth resource size, bandwidth resource location, QoS parameter information.

Alternatively, the processor is configured to select a bandwidth size and/or a bandwidth resource location for the first station according to the signal detection result of the radio frame carrying the instruction information.

Alternatively, the processor is configured to, when the instruction information does not carry information of whether to allow the access point to trigger the first station and one or more other stations to perform uplink transmission, trigger the first station and one or more other stations to perform uplink transmission.

Alternatively, the processor is configured to, when the instruction information carries the information concerning the size of bandwidth resources that need to be occupied by the first station for subsequent uplink transmission, allocate at least the transmission bandwidth corresponding to the bandwidth resource size information to the first station.

Alternatively, the processor is configured to, when the instruction information carries the information concerning the position of bandwidth resources that need to be occupied by the first station for subsequent uplink transmission, allocate at least bandwidth resources corresponding to the bandwidth resource location information to the first station.

Alternatively, the processor is configured to, when the QoS parameter information comprises at least one of data buffer status information of a station, maximum or minimum length information of a data packet that is allowed to be transmitted by the station, a minimum guaranteed bit rate of the station, and minimum modulation and coding scheme (MCS) rate requirements of the station, allocate a bandwidth size and/or a bandwidth resource location to the first station for uplink transmission according to the QoS parameter information.

Alternatively, the channel allocated by the access point to the first station is continuous or non-continuous in frequency band.

Alternatively, the length of time, during which the first station or the first station and one or more other stations perform uplink transmission, is less than or equal to the length of the transmission time that the first station has contended for.

According to still another aspect of the embodiments of the present disclosure, there is provided a multi-station transmission execution device, the device being applied to one or more stations and comprising: a processor; and a memory configured to store instructions executable by the processor; wherein the processor is configured to: receive a radio frame carrying trigger information sent by an access point, the radio frame carrying the trigger information being used for triggering the one or more stations to perform uplink transmission, wherein the one or more stations are stations other than a first station; ignore the NAV configured by the first station and perform uplink transmission according to the radio frame.

Alternatively, the processor is configured to, if the one or more stations, for which the first station configures the NAV, obtain random access resource information and are allowed to access on the random access resources, ignore the NAV configured by the first station and contend for access on the random access resources.

Further provided in the embodiments of the present disclosure is a computer readable storage medium storing computer executable instructions for executing the multi-station transmission instruction method of any one of the foregoing, and/or the multi-station transmission triggering method of any one of the foregoing, and/or the multi-station transmission execution method of any one of the foregoing.

Other features and advantages of the embodiments of the present disclosure will be set forth in the following description, and in part will be obvious from the description, or may be learned by practice of the disclosure. The objectives and other advantages of the disclosure may be realized and obtained by the structure particularly specified in the description, the claims as well as the appended drawings.

Other aspects will become apparent upon reading and understanding the drawings and detailed description.

BRIEF DESCRIPTION OF THE DRAWINGS

The accompanying drawings described herein are used to provide a further understanding of the embodiments of the present disclosure and form part of the application. The schematic embodiments and the descriptions of the embodiments of the present disclosure are used to explain the present disclosure, and do not constitute improper limitations to the present disclosure. In the drawings:

FIG. 1 is a schematic diagram of a WLAN basic service set according to the related art;

FIG. 2 is a schematic diagram of multi-station transmission frame exchange according to the related art;

FIG. 3 is a flowchart of a multi-station transmission instruction method according to an embodiment of the present disclosure;

DETAILED DESCRIPTION

Figure 4:
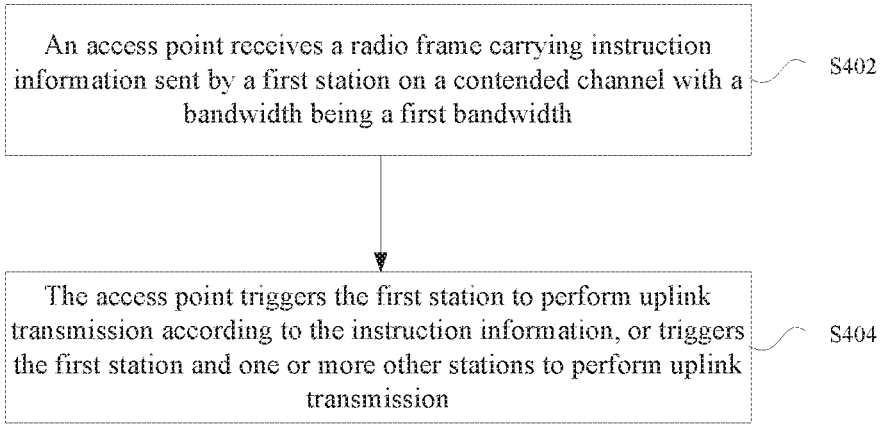
FIG. 4 is a flowchart of a multi-station transmission triggering method according to an embodiment of the present disclosure.

Hereinafter, the present disclosure will be described in detail with reference to the accompanying drawings and in combination with the embodiments. It should be noted that, in the case of no conflict, the embodiments in the present application and the features in the embodiments may be combined with each other.

It should be noted that the terms "first", "second" and the like in the description and claims of the present disclosure as well as the drawings are used to distinguish similar objects, and are not necessarily used to describe a specific sequence or a chronological sequence.

In this embodiment, a multi-station transmission instruction method is provided. FIG. 3 is a flowchart of a multi-station transmission instruction method according to an embodiment of the present disclosure. As shown in FIG. 3, the process comprises the following steps:

Step S302: The first station sends a radio frame carrying instruction information on a contended channel with a bandwidth being a first bandwidth to an access point, wherein the instruction information is used for instructing the access point to trigger the first station, or, trigger the first station and one or more other stations to perform uplink transmission, and the instruction information comprises at least one of: information for instructing whether to allow the access point to trigger the first station and one or more other stations to perform uplink transmission; information concerning the size of bandwidth resources that need to be occupied by the first station for subsequent uplink transmission; information concerning the position of bandwidth resources that need to be occupied by the first station for subsequent uplink transmission; and quality of service (QoS) parameter information of the first station.

Through the abovementioned steps, when the station obtains a transmission opportunity but does not use all the bandwidth resources of the transmission opportunity, the station can send instruction information to an access point and the access point triggers uplink multi-station transmission according to the instruction information, thereby solving the problem in the related art that if some station obtains certain channel resources by contention but the station itself occupies only a part of the channel resources for transmission, as all the bandwidth resources obtained by contention have been claimed by the station for occupation, other stations are unable to contend for occupation, resulting in the waste of frequency resources, and further effectively avoiding the waste of air interface resources during large bandwidth transmission.

In a preferred implementation, the bandwidth resource size information is used for indicating a first part of the first bandwidth; and/or the bandwidth resource location information is used for indicating the position of a channel with a bandwidth being the first part of the first bandwidth.

Preferably, the bandwidth resource location may be continuous in frequency band, and of course may also be non-continuous.

Preferably, in step S302, after the first station sends the radio frame carrying the instruction information to the access point, the method may further comprise the following step:

Step S1: The first station receives the radio frame carrying trigger information sent by the access point, wherein the radio frame carrying the trigger information is used for indicating the channel allocated by the access point to the first station; and the first station performs uplink transmission on the channel allocated by the access point to the first station.

Preferably, the length of time, during which the first station or the first station and one or more other stations perform uplink transmission, is less than or equal to the length of the transmission time that the first station has contended for.

In a preferred implementation, the QoS parameter information comprises at least one of:

(1) data buffer status information of the first station;

(2) maximum or minimum length information of a data packet that is allowed to be transmitted by the first station;

(3) a minimum guaranteed bit rate of the first station;

(4) minimum modulation and coding scheme (MCS) rate requirements of the first station.

Preferably, in step S302, before the first station sends the radio frame, the method may further comprise the following step:

Step S2: The first station performs channel detection, and selects, according to the channel sense result, the position of bandwidth resources that need to be occupied for subsequent uplink transmission.

In this embodiment, a multi-station transmission triggering method is provided. FIG. 4 is a flowchart of a multi-station transmission triggering method according to an embodiment of the present disclosure. As shown in FIG. 4, the process comprises the following steps:

Step S402: An access point receives a radio frame carrying instruction information sent by a first station on a contended channel with a bandwidth being a first bandwidth;

Step S404: The access point triggers the first station to perform uplink transmission according to the instruction information, or triggers the first station and one or more other stations to perform uplink transmission.

Through the foregoing embodiment, when the station obtains a transmission opportunity but does not use all the bandwidth resources of the transmission opportunity, the bandwidth resources can be released, and the AP triggers uplink multi-station transmission, so as to avoid the waste of air interface resources during large bandwidth transmission.

Preferably, the abovementioned instruction information may comprise, but is not limited to at least one of:

(1) information for instructing whether to allow the access point to trigger the first station and one or more other stations to perform uplink transmission;

(2) information concerning the size of bandwidth resources that need to be occupied by the first station for subsequent uplink transmission;

(3) information concerning the position of bandwidth resources that need to be occupied by the first station for subsequent uplink transmission;

(4) quality of service (QoS) parameter information of the first station.

Preferably, the abovementioned QoS parameter information may comprise, but is not limited to, at least one of:

(1) data buffer status information of the first station;

(2) maximum or minimum length information of a data packet that is allowed to be transmitted by the first station;

(3) a minimum guaranteed bit rate of the first station;

(4) minimum MCS rate requirements of the first station.

Preferably, in step S404, before the access point triggers the first station to perform uplink transmission according to the instruction information, or triggers the first station and one or more other stations to perform uplink transmission, the method further comprises one of the following operations:

Step S3, the access point performs channel detection and selects, according to the channel sense result, a bandwidth size and/or a bandwidth resource location for uplink transmission of the first station;

Step S4: the access point performs channel detection and selects, according to the channel sense result, a bandwidth size and/or a bandwidth resource location for the first station and one or more other stations to perform uplink transmission.

Preferably, in step S404, by sending the radio frame carrying the trigger information according to the instruction information, the access point may trigger the first station to perform uplink transmission, or trigger the first station and one or more other stations to perform uplink transmission, wherein the transmission bandwidth of the radio frame carrying the trigger information is greater than, equal to or less than the first bandwidth.

Preferably, in step S404, when the instruction information carries information of whether to allow the access point to trigger the first station and one or more other stations to perform uplink transmission and the information indicates that the access point is allowed, the access point triggers the first station and one or more other stations to perform uplink transmission; if the information indicates that the access point is not allowed, the access point allocates, according to the parameter information set of the sending first station, a bandwidth size and/or a bandwidth resource location to the first station for uplink transmission, wherein the parameter information set comprises at least one of: bandwidth resource size, bandwidth resource location, QoS parameter information.

Preferably, in step S404, when the instruction information carries information of whether to allow the access point to trigger the first station and one or more other stations to perform uplink transmission, if the information indicates that the access point is not allowed and the instruction information does not carry the parameter information set of the first station, the access point allocates, according to the channel sense result, a bandwidth size and/or a bandwidth resource location to the first station for uplink transmission, wherein the parameter information set comprises at least one of: bandwidth resource size, bandwidth resource location, QoS parameter information.

In a preferred implementation, the access point may select a bandwidth size and/or a bandwidth resource location for the first station according to the signal detection result of the radio frame carrying the instruction information.

Preferably, in step S404, when the instruction information does not carry the information of whether to allow the access point to trigger the first station and one or more other stations to perform uplink transmission, the access point triggers the first station and one or more other stations to perform uplink transmission.

Preferably, in step S404, when the instruction information carries the information concerning the size of bandwidth resources that need to be occupied by the first station for subsequent uplink transmission, the access point allocates at least the transmission bandwidth corresponding to the bandwidth resource size information to the first station.

Preferably, in step S404, when the instruction information carries the information concerning the position of bandwidth resources that need to be occupied by the first station for subsequent uplink transmission, the access point allocates at least bandwidth resources corresponding to the bandwidth resource location information to the first station.

Preferably, in step S404, when the QoS parameter information comprises at least one of data buffer status information of a station, maximum or minimum length information of a data packet that is allowed to be transmitted by the station, a minimum guaranteed bit rate of the station, and minimum modulation and coding scheme (MCS) rate requirements of the station, the access point allocates, according to the QoS parameter information, a bandwidth size and/or a bandwidth resource location to the first station for uplink transmission.

In a preferred implementation, the channel allocated by the access point to the first station is continuous or non-continuous in frequency band.

In a preferred implementation, the length of time, during which the first station or the first station and one or more other stations perform uplink transmission, is less than or equal to the length of the transmission time that the first station has contended for.

Figure 5:
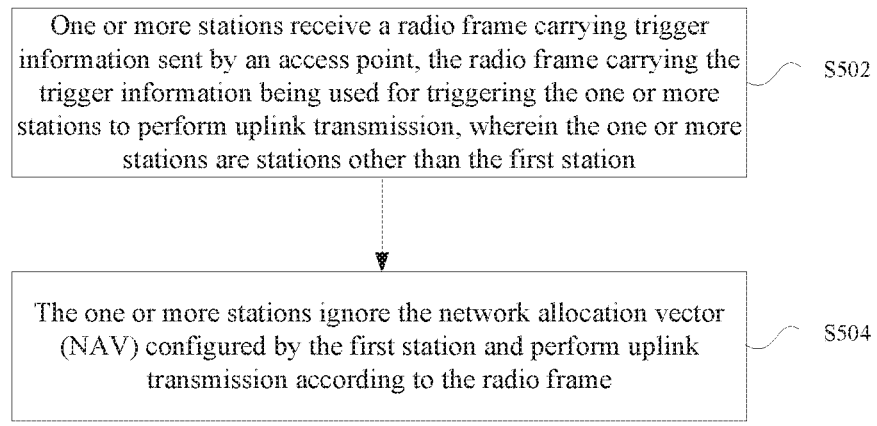
FIG. 5 is a flowchart of a multi-station transmission execution method according to an embodiment of the present disclosure.

In this embodiment, a multi-station transmission instruction method is provided. FIG. 5 is a flowchart of a multi-station transmission execution method according to an embodiment of the present disclosure. As shown in FIG. 5, the process comprises the following steps:

Step S502: One or more stations receive a radio frame carrying trigger information sent by an access point, the radio frame carrying the trigger information being used for triggering the one or more stations to perform uplink transmission, wherein the one or more stations are stations other than the first station;

Step S504: The one or more stations ignore the network allocation vector (NAV) configured by the first station and perform uplink transmission according to the radio frame.

Preferably, in step S504, if the one or more stations, for which the first station has configured the NAV, obtain random access resource information, and are allowed to access on the random access resources, the one or more stations ignore the NAV configured by the first station and contend for access on the random access resources.

The above preferred embodiments will be further described below with reference to the following preferred embodiments.

Preferred Embodiment I

Figure 6:
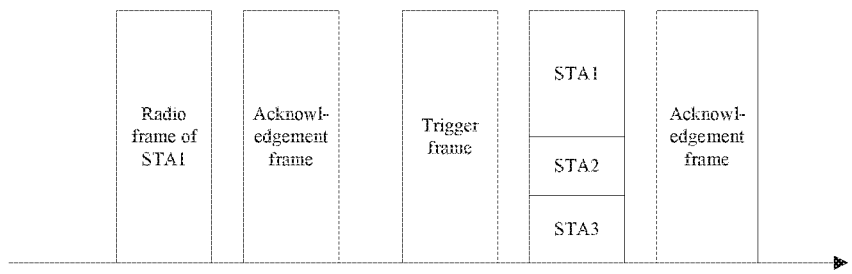
FIG. 6 is a schematic diagram of a multi-station transmission method according to a preferred embodiment I of the present disclosure.

FIG. 6 is a schematic diagram of a multi-station transmission method according to a preferred embodiment I of the present disclosure. As shown in FIG. 6, STA1 contends for sending a radio frame on a channel with a bandwidth of 80 MHz and obtains a transmission opportunity, wherein the duration of the transmission opportunity is T1. STA1 carries the instruction information in the sent radio frame, and notifies the AP that its subsequent transmission needs at least 40 MHz of bandwidth resources.

After receiving the radio frame carrying the instruction information from STA1, the AP first replies with a response frame (which may be an acknowledgment frame) to STA1, indicating that itself has already received the radio frame. Subsequently, the AP performs channel detection and performs the scheduling of uplink multi-station transmission according to the detection result.

The overall bandwidth for an AP to perform uplink multi-station scheduling may be 80 MHz or greater than 80 MHz. In the preferred embodiment, after the channel detection, the AP uses 80 MHz that STA1 has contended for uplink multi-station transmission. Because STA1 already declares that it needs at least 40 MHz of bandwidth, the AP allocates at least 40 MHz of bandwidth resources to STA1 when scheduling uplink multi-station transmissions. Unless STA1 states otherwise, the resources allocated by the AP to STA1 may be continuous or non-continuous in frequency band. The AP allocates the remaining bandwidth resources evenly to STA2 and STA3, that is, 20 MHz each, and carries the resource allocation information in the sent trigger frame.

STA1, STA2 and STA3 each receive the abovementioned trigger frame, and perform uplink multi-station transmission according to the resource allocation information in the trigger frame. The transmission time for the AP scheduling uplink multi-station transmission does not exceed the time length T1 of the transmission opportunity obtained by STA1.

STA2 and STA3, as listening stations, after listening to the radio frame sent by STA1, configure the NAV, but then receive the trigger frame sent by the AP, in which they are scheduled to participate in the uplink multi-station transmission, STA2 and STA3 ignore the NAV and perform the sending.

Preferred Embodiment II

Figure 7:
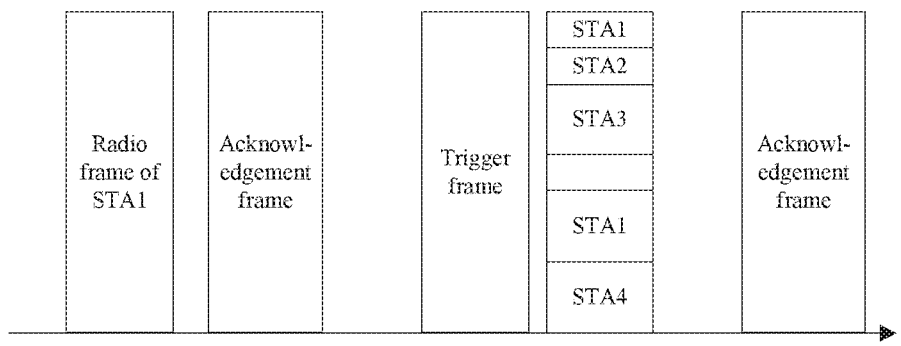
FIG. 7 is a schematic diagram of a multi-station transmission method according to a preferred embodiment II of the present disclosure.

FIG. 7 is a schematic diagram of a multi-station transmission method according to a preferred embodiment II of the present disclosure. As shown in FIG. 7, STA1 contends for sending a radio frame on a channel with a bandwidth of 20 MHz and obtains a transmission opportunity. The duration of the transmission opportunity is T1. 20 MHz is divided into nine sub-channels by using 26 subcarriers as a resource granularity. STA1 carries the instruction information in the sent radio frame to inform the AP that its subsequent transmission needs at least the occupied bandwidth resource location information, that is, which sub-channels are specifically required to be occupied. The selection of sub-channels by STA1 is based on its measurement result of the channel, and the sub-channels occupied by STA1 may be continuous or non-continuous.

After receiving the radio frame carrying the instruction information from STA1, the AP first replies with a response frame (which may be an acknowledgment frame) to STA1, indicating that itself has already received the radio frame. Subsequently, the AP performs channel detection and performs the scheduling of uplink multi-station transmission according to the detection result.

The overall bandwidth for an AP to perform uplink multi-station scheduling may be 20 MHz or greater than 20 MHz. In the preferred embodiment, after the channel detection, the AP uses 20 MHz that STA1 has contended for uplink multi-station transmission. Because STA1 already declares which sub-channels that it needs to occupy at least, then when the AP schedules uplink multi-station transmission, at least the abovementioned sub-channels are allocated to STA1. In addition, the AP allocates the remaining bandwidth resources to other stations and carries the resource allocation information in the sent trigger frame.

The other stations receive the abovementioned trigger frame and perform uplink multi-station transmission according to the resource allocation information in the trigger frame. The transmission time for the AP scheduling uplink multi-station transmission does not exceed the time length T1 of the transmission opportunity obtained by STA1.

In addition, other listening stations, after listening to the radio frame sent by STA1, configure the NAV, but then receive the trigger frame sent by the AP, in which they are scheduled to participate in the uplink multi-station transmission, they ignore the NAV and perform the sending.

Preferred Embodiment III

Figure 8:
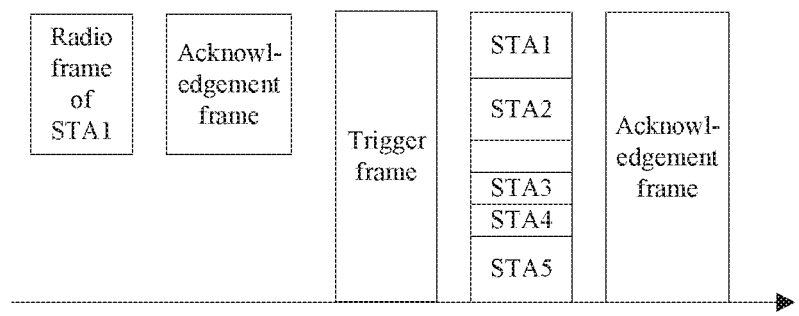
FIG. 8 is a schematic diagram of a multi-station transmission method according to a preferred embodiment III of the present disclosure.

FIG. 8 is a schematic diagram of a multi-station transmission method according to a preferred embodiment III of the present disclosure. As shown in FIG. 8, STA1 contends for sending a radio frame on a channel with a bandwidth of 20 MHz and obtains a transmission opportunity. The duration of the transmission opportunity is T1. 20 MHz is divided into nine sub-channels by using 26 subcarriers as a resource granularity. STA1 carries the instruction information in the sent radio frame to inform the AP that its subsequent transmission needs at least the occupied bandwidth resource location information, that is, which sub-channels are specifically required to be occupied. The selection of sub-channels by STA1 is based on its measurement result of the channel, and the sub-channels occupied by STA1 may be continuous or non-continuous.

After receiving the radio frame carrying the instruction information from STA1, the AP first replies with a response frame (which may be an acknowledgment frame) to STA1, indicating that itself has already received the radio frame. Subsequently, the AP performs channel detection and performs the scheduling of uplink multi-station transmission according to the detection result.

In the preferred embodiment, after the channel detection, the bandwidth for an AP to perform uplink multi-station transmission is 40 MHz, wherein 20 MHz is the 20 MHz that STA1 has contended for. Because STA1 already declares which sub-channels that it needs to occupy at least, then when the AP schedules uplink multi-station transmission, at least the abovementioned sub-channels are allocated to STA1. In addition, the AP allocates the remaining bandwidth resources to other stations and carries the resource allocation information in the sent trigger frame.

The other stations receive the abovementioned trigger frame and perform uplink multi-station transmission according to the resource allocation information in the trigger frame. The transmission time for the AP scheduling uplink multi-station transmission does not exceed the time length T1 of the transmission opportunity obtained by STA1.

Other listening stations, after listening to the radio frame sent by STA1, configure the NAV, but then receive the trigger frame sent by the AP, in which they are scheduled to participate in the uplink multi-station transmission, they ignore the NAV and perform the sending.

Preferred Embodiment IV

Figure 9:
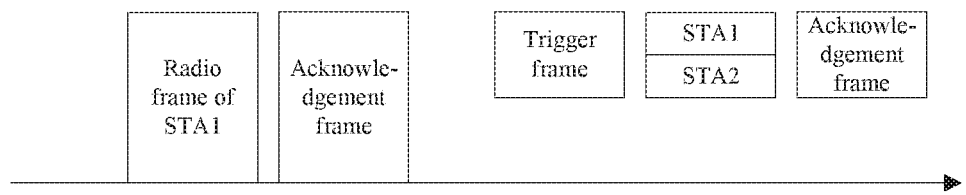
FIG. 9 is a schematic diagram of a multi-station transmission method according to a preferred embodiment IV of the present disclosure.

FIG. 9 is a schematic diagram of a multi-station transmission method according to a preferred embodiment IV of the present disclosure. As shown in FIG. 9, STA1 contends for sending a radio frame on a channel with a bandwidth of 80 MHz and obtains a transmission opportunity. The duration of the transmission opportunity is T1. STA1 carries the instruction information in the sent radio frame to inform the AP that its subsequent transmission needs at least 20 MHz of bandwidth resources.

After receiving the radio frame carrying the instruction information from STA1, the AP first replies with a response frame (which may be an acknowledgment frame) to STA1, indicating that itself has already received the radio frame. Subsequently, the AP performs channel detection and performs the scheduling of uplink multi-station transmission according to the detection result.

The overall bandwidth for an AP to perform uplink multi-station scheduling may be 80 MHz. In the preferred embodiment, after the channel detection, it is determined that the bandwidth used by the AP for uplink multi-station transmission is 40 MHz, and because STA1 already declares that itself needs at least 20 MHz of bandwidth, then when the AP schedules uplink multi-station transmission, at least 20 MHz of bandwidth resources are allocated to STA1. Unless STA1 states otherwise, the resources allocated by the AP to STA1 may be continuous or non-continuous in frequency band. Meanwhile, the AP allocates the remaining bandwidth resources evenly to other stations, and carries the resource allocation information in the sent trigger frame.

The other stations receive the abovementioned trigger frame and perform uplink multi-station transmission according to the resource allocation information in the trigger frame. The transmission time for the AP scheduling uplink multi-station transmission does not exceed the time length T1 of the transmission opportunity obtained by STA1.

Other listening stations, after listening to the radio frame sent by STA1, configure the NAV, but then receive the trigger frame sent by the AP, in which they are scheduled to participate in the uplink multi-station transmission, they ignore the NAV and perform the sending.

Preferred Embodiment V

Figure 10:
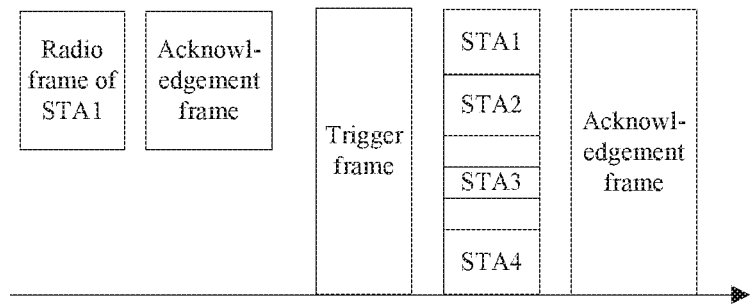
FIG. 10 is a schematic diagram of a multi-station transmission method according to a preferred embodiment V of the present disclosure.

FIG. 10 is a schematic diagram of a multi-station transmission method according to a preferred embodiment V of the present disclosure. As shown in FIG. 10, STA1 contends for sending a radio frame on a channel with a bandwidth of 20 MHz and obtains a transmission opportunity. The duration of the transmission opportunity is T1. STA1 carries the instruction information in the sent radio frame to inform the AP of which sub-channels that its subsequent transmission at least needs to occupy. The selection of sub-channels by STA1 is based on its measurement result of the channel, and the sub-channels occupied by STA1 may be continuous or non-continuous.

After receiving the radio frame carrying the instruction information from STA1, the AP first replies with a response frame (which may be an acknowledgment frame) to STA1, indicating that itself has already received the radio frame. Subsequently, the AP performs channel detection and performs the scheduling of uplink multi-station transmission according to the detection result.

In the preferred embodiment, after the channel detection, the bandwidth for an AP to perform uplink multi-station transmission is 40 MHz, wherein 20 MHz is the 20 MHz that STA1 has contended for. Because STA1 already declares which sub-channels that it needs to occupy at least, then when the AP schedules uplink multi-station transmission, at least the abovementioned sub-channels are allocated to STA1. Meanwhile, the AP allocates the remaining bandwidth resources to other stations and carries the resource allocation information in the sent trigger frame. The allocated uplink multi-station transmission performed by the AP may be continuous or non-continuous in frequency band, and the preferred embodiment is an example of a non-continuous allocation.

The other stations receive the abovementioned trigger frame and perform uplink multi-station transmission according to the resource allocation information in the trigger frame. The transmission time for the AP scheduling uplink multi-station transmission does not exceed the time length T1 of the transmission opportunity obtained by STA1.

Other listening stations, after listening to the radio frame sent by STA1, configure the NAV, but then receive the trigger frame sent by the AP, in which they are scheduled to participate in the uplink multi-station transmission, they ignore the NAV and perform the sending.

Preferred Embodiment VI

Figure 11:
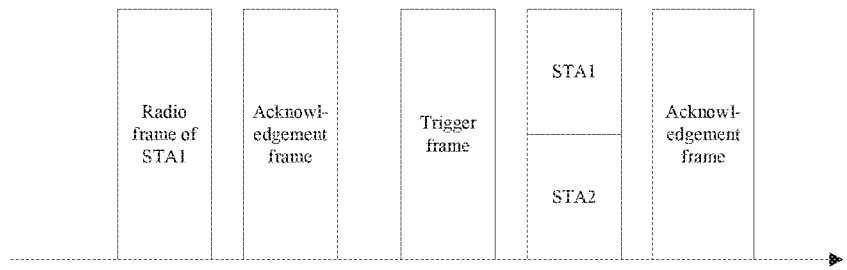
FIG. 11 is a schematic diagram of a multi-station transmission method according to a preferred embodiment VI of the present disclosure.

FIG. 11 is a schematic diagram of a multi-station transmission method according to a preferred embodiment VI of the present disclosure. As shown in FIG. 11, STA1 contends for sending a radio frame on a channel with a bandwidth of 80 MHz and obtains a transmission opportunity. The duration of the transmission opportunity is T1. STA1 carries the instruction information in the sent radio frame to inform the AP that its subsequent transmission needs at least 40 MHz of bandwidth resources.

After receiving the radio frame carrying the instruction information from STA1, the AP first replies with a response frame (which may be an acknowledgment frame) to STA1, indicating that itself has already received the radio frame. Subsequently, the AP performs channel detection and performs the scheduling of uplink multi-station transmission according to the detection result.

In the preferred embodiment, after the channel detection, the AP uses 80 MHz that STA1 has contended for uplink multi-station transmission. Because STA1 already declares that it needs at least 40 MHz of bandwidth, the AP allocates at least 40 MHz of bandwidth resources to STA1 when scheduling uplink multi-station transmissions. Unless STA1 states otherwise, the resources allocated by the AP to STA1 may be continuous or non-continuous in frequency band. Meanwhile, the AP allocates the remaining bandwidth resources as random access resources.

Other listening stations, after listening to the radio frame sent by STA1, configure the NAV, but then receive the trigger frame sent by the AP, in which there are resources allowing for random access, then the other stations may ignore the NAV and contend for the sending. In the preferred embodiment, the station contending for and obtaining the resources is STA2, and STA2 sends its own data packet.

The transmission time for the AP scheduling uplink multi-station transmission does not exceed the time length T1 of the transmission opportunity obtained by STA1. If another station obtains the random access resources allocated by the AP, the time during which the station occupies the channel does not exceed T1.

Preferred Embodiment VII

STA1 contends for sending a radio frame on a channel with a bandwidth of 80 MHz and obtains a transmission opportunity. The duration of the transmission opportunity is T1. STA1 carries the instruction information in the sent radio frame to inform the AP that its subsequent transmission needs at least 40 MHz of bandwidth resources.

After receiving the radio frame carrying the instruction information from STA1, the AP first replies with a response frame to STA1, indicating that itself has already received the radio frame. The AP believes that it may perform uplink multi-user scheduling, and the AP performs channel detection and performs the scheduling of uplink multi-station transmission according to the detection result and the buffering status of each station.

In the preferred embodiment, after the channel detection, the AP uses 80 MHz that STA1 has contended for uplink multi-user transmission. Because STA1 already declares that it needs at least 40 MHz of bandwidth and STA1 carries its QoS parameter information in the instruction information comprising: data buffer status information; maximum or minimum length information of a data packet that is allowed; a minimum guaranteed bit rate; minimum MCS rate requirements, the AP at least allocates sub-channels of 40 MHz of bandwidth to STA1 The AP allocates the remaining bandwidth resources as random access resources, and allows the stations under the AP listening to the trigger frame to perform random access.

Other listening stations, after listening to the radio frame sent by STA1, configure the NAV, but then receive the trigger frame sent by the AP, in which there are resources allowing for random access, then the other stations may ignore the NAV and contend for the sending.

The transmission time for the AP scheduling uplink multi-station transmission does not exceed the time length T1 of the transmission opportunity obtained by STA1. If another station obtains the random access resources allocated by the AP, the time during which the station occupies the channel does not exceed T1.

Preferred Embodiment VIII

STA1 contends for sending a radio frame on a channel with a bandwidth of 80 MHz and obtains a transmission opportunity. The duration of the transmission opportunity is T1. STA1 carries the instruction information in the sent radio frame, indicating that the AP is not allowed to schedule uplink multi-user transmission. STA1 declares in the instruction information one or more of: the bandwidth that it needs to occupy itself, which sub-channels it needs to occupy, and its own QoS parameter information.

After receiving the radio frame carrying the instruction information from STA1, the AP first replies with a response frame to STA1, indicating that itself has already received the radio frame. Because STA1 does not allow the AP to perform uplink multi-user transmission scheduling, the AP performs channel selection for STA1 according to the information declared by STA1. For example, when STA1 declares that it needs 40 MHz bandwidth, the AP performs measurement according to the received radio frame and allocates a channel greater than or equal to 40 MHz to STA1 according to the channel detection. If STA1 declares which sub-channels it needs to occupy, the AP performs measurement according to the received radio frame and allocates corresponding sub-channels or other more appropriate sub-channels to STA1 in combination with the channel detection. If STA1 declares its own QoS parameter and its own required bandwidth, the AP performs measurement according to the received radio frame, and allocates, in combination with its own channel detection, to STA1 to a channel capable of satisfying its bandwidth and QoS requirements.

If the instruction information of STA1 does not carry the bandwidth resource size, bandwidth resource location and QoS parameter information of the station, the AP allocates uplink transmission resources to STA1 according to the measurement of the radio frame sent by STA1 in combination with the channel sense result.

Through the abovementioned description of the embodiments, those skilled in the art can clearly understand that the method according to the abovementioned embodiments may be implemented by software plus a necessary universal hardware platform, and certainly may also be implemented by hardware. However, in many cases, the former is a better implementation. Based on this understanding, the technical solution of the present disclosure essentially, or the part contributing to the prior art, may be embodied in the form of a software product, and the computer software product is stored on a storage medium (such as a ROM/RAM, a magnetic disk, an optical disk) and comprises several instructions to enable a terminal device (which may be a mobile phone, a computer, a server, or a network device) to execute the methods according to respective embodiments of the present disclosure.

In this embodiment, a multi-station transmission instructions device is further provided, which is used for implementing the foregoing embodiments and the preferred embodiments, and details thereof which have been described will not described again. As used below, the term "module" may be a combination of software and/or hardware that achieves a predetermined function. Although the devices described in the following embodiments are preferably implemented in software, the implementation of hardware or a combination of software and hardware is also possible and contemplated.

Figure 12:
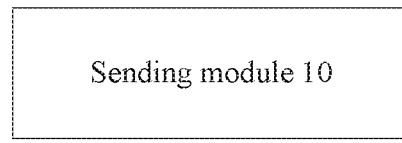
FIG. 12 is a structural block diagram of a multi-station transmission instruction device according to an embodiment of the present disclosure.

FIG. 12 is a structural block diagram of a multi-station transmission instruction device according to an embodiment of the present disclosure. As shown in FIG. 12, the device is applied to a station. The device may comprise: a sending module 10, configured to send a radio frame carrying instruction information on a contended channel with a bandwidth being a first bandwidth to an access point, wherein the instruction information is used for instructing the access point to trigger the first station or trigger the first station and one or more other stations to perform uplink transmission, and the instruction information may comprise but is not limited to at least one of:

(1) information for instructing whether to allow the access point to trigger the first station and one or more other stations to perform uplink transmission;

(2) information concerning the size of bandwidth resources that need to be occupied by the first station for subsequent uplink transmission;

(3) information concerning the position of bandwidth resources that need to be occupied by the first station for subsequent uplink transmission;

(4) QoS parameter information of the first station.

Preferably, the information concerning the size of bandwidth resources is used for indicating a first part of the first bandwidth; and/or the information concerning the position of bandwidth resources is used for indicating the position of a channel with a bandwidth being the first part of the first bandwidth.

Preferably, the position of bandwidth resources is continuous or non-continuous in frequency band.

Figure 13:
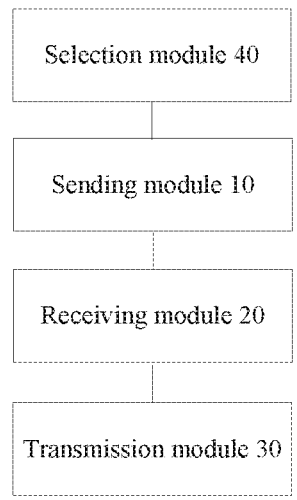
FIG. 13 is a structural block diagram of a multi-station transmission instruction device according to a preferred embodiment of the present disclosure.

FIG. 13 is a structural block diagram of a multi-station transmission instruction device according to a preferred embodiment of the present disclosure. As shown in FIG. 13, in addition to all the modules shown in FIG. 12, the device may further comprise: a receiving module 20, configured to receive a radio frame carrying trigger information sent by the access point, wherein the radio frame carrying the trigger information is used for indicating the channel allocated by the access point to the first station; and a transmission module 30, configured to perform uplink transmission on the channel allocated by the access point to the first station.

Preferably, the length of time, during which the first station or the first station and one or more other stations perform uplink transmission, is less than or equal to the length of the transmission time that the first station has contended for.

Preferably, the QoS parameter information may comprise but is not limited to at least one of:

(1) data buffer status information of the first station;

(2) maximum or minimum length information of a data packet that is allowed to be transmitted by the first station;

(3) a minimum guaranteed bit rate of the first station;

(4) minimum MCS rate requirements of the first station.

Preferably, as shown in FIG. 13, the device may further comprise: a selection module 40, configured to perform channel detection, and select, according to the channel sense result, the position of bandwidth resources that need to be occupied for subsequent uplink transmission.

In this embodiment, a multi-station transmission triggering device is further provided, which is used for implementing the foregoing embodiments and the preferred embodiments, and details thereof which have been described will not be described again.

Figure 14:
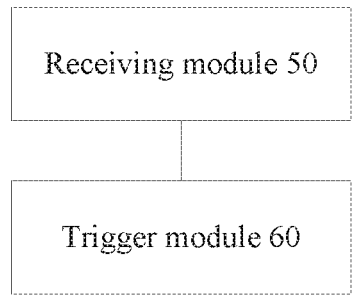
FIG. 14 is a structural block diagram of a multi-station transmission triggering device according to an embodiment of the present disclosure.

FIG. 14 is a structural block diagram of a multi-station transmission triggering device according to an embodiment of the present disclosure. As shown in FIG. 14, the device is applied to an access point. The device may comprise: a receiving module 50, configured to receive a radio frame carrying instruction information sent by a first station on a contended channel with a bandwidth being the first bandwidth; and a triggering module 60, configured to, according to the instruction information, trigger the first station to perform uplink transmission, or trigger the first station and one or more other stations to perform uplink transmission.

Preferably, the instruction information may comprise but is not limited to at least one of:

(1) information for instructing whether to allow the access point to trigger the first station and one or more other stations to perform uplink transmission;

(2) information concerning the size of bandwidth resources that need to be occupied by the first station for subsequent uplink transmission;

(3) information concerning the position of bandwidth resources that need to be occupied by the first station for subsequent uplink transmission;

(4) quality of service (QoS) parameter information of the first station.

Preferably, the QoS parameter information may comprise but is not limited to at least one of:

(1) data buffer status information of the first station;

(2) maximum or minimum length information of a data packet that is allowed to be transmitted by the first station;

(3) a minimum guaranteed bit rate of the first station;

(4) minimum MCS rate requirements of the first station.

Figure 15:
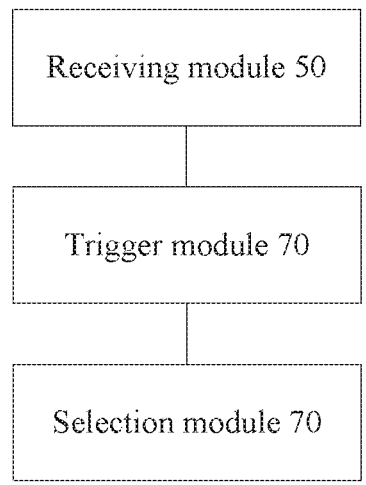
FIG. 15 is a structural block diagram of a multi-station transmission triggering device according to a preferred embodiment of the present disclosure.

FIG. 15 is a structural block diagram of a multi-station transmission triggering device according to a preferred embodiment of the present disclosure. As shown in FIG. 15, in addition to all the modules shown in FIG. 14, the device may further comprise: a selection module 70, configured to perform channel detection, and perform one of the following operations according to the channel sense result: select, according to the channel sense result, a bandwidth size and/or a bandwidth resource location for uplink transmission of the first station; and select, according to the channel sense result, a bandwidth size and/or a bandwidth resource location for the first station and one or more other stations to perform uplink transmission.

Preferably, the triggering module 60 is configured to, by sending the radio frame carrying the trigger information according to the instruction information, trigger the first station to perform uplink transmission, or trigger the first station and one or more other stations to perform uplink transmission, wherein the transmission bandwidth of the radio frame carrying the trigger information is greater than, equal to or less than the first bandwidth.

Preferably, the triggering module 60 is configured to, when the instruction information carries information of whether to allow the access point to trigger the first station and one or more other stations to perform uplink transmission and the information indicates that the access point is allowed, trigger the first station and one or more other stations to perform uplink transmission, and if the information indicates that the access point is not allowed, allocate, according to the parameter information set of the sending first station, a bandwidth size and/or a bandwidth resource location to the first station for uplink transmission, wherein the parameter information set comprises at least one of: bandwidth resource size, bandwidth resource location, QoS parameter information.

Preferably, the triggering module 60 is configured to, when the instruction information carries information of whether to allow the access point to trigger the first station and one or more other stations to perform uplink transmission, if the information indicates that the access point is not allowed and the instruction information does not carry the parameter information set of the first station, allocate, according to the channel sense result, a bandwidth size and/or a bandwidth resource location to the first station for uplink transmission, wherein the parameter information set comprises at least one of: bandwidth resource size, bandwidth resource location, QoS parameter information.

Preferably, the triggering module 60 is configured to select a bandwidth size and/or a bandwidth resource location for the first station according to the signal detection result of the radio frame carrying the instruction information.

Preferably, the triggering module 60 is configured to, when the instruction information does not carry information of whether to allow the access point to trigger the first station and one or more other stations to perform uplink transmission, trigger the first station and one or more other stations to perform uplink transmission.

Preferably, the triggering module 60 is configured to, when the instruction information carries the information concerning the size of bandwidth resources that need to be occupied by the first station for subsequent uplink transmission, allocate at least the transmission bandwidth corresponding to the bandwidth resource size information to the first station.

Preferably, the triggering module 60 is configured to, when the instruction information carries the information concerning the position of bandwidth resources that need to be occupied by the first station for subsequent uplink transmission, allocate at least bandwidth resources corresponding to the bandwidth resource location information to the first station.

Preferably, the triggering module 60 is configured to, when the QoS parameter information comprises at least one of data buffer status information of a station, maximum or minimum length information of a data packet that is allowed to be transmitted by the station, a minimum guaranteed bit rate of the station, and minimum modulation and coding scheme (MCS) rate requirements of the station, allocate a bandwidth size and/or a bandwidth resource location to the first station for uplink transmission according to the QoS parameter information.

In a preferred implementation, the channel allocated by the access point to the first station is continuous or non-continuous in frequency band.

In a preferred implementation, the length of time, during which the first station or the first station and one or more other stations perform uplink transmission, is less than or equal to the length of the transmission time that the first station has contended for.

Figure 16:
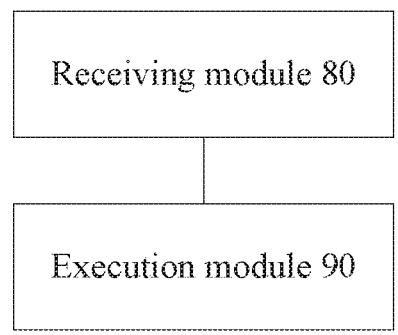
FIG. 16 is a structural block diagram of a multi-station transmission execution device according to an embodiment of the present disclosure.

FIG. 16 is a structural block diagram of a multi-station transmission execution device according to an embodiment of the present disclosure. As shown in FIG. 16, the device is applied to one or more stations. The device may comprise: a receiving module 80 configured to receive a radio frame carrying trigger information sent by an access point, the radio frame carrying the trigger information being used for triggering the one or more stations to perform uplink transmission, wherein the one or more stations are stations other than a first station; an execution module 90, configured to ignore the NAV configured by the first station and perform uplink transmission according to the radio frame.

Preferably, the execution module 90 is configured to, if the one or more stations, for which the first station configures the NAV, obtain random access resource information and are allowed to access on the random access resources, ignore the NAV configured by the first station and contend for access on the random access resources.

It should be noted that, each of the foregoing modules may be implemented by software or hardware, and the latter may be implemented in the following manner, but not limited thereto: the foregoing modules are all located in the same processor; or the foregoing modules are respectively located in multiple processors.

Further provided in the embodiments of the present disclosure is a storage medium. Alternatively, in the present embodiment, the abovementioned storage medium may be configured to store program code for performing the following steps:

S1, a first station sending a radio frame carrying instruction information on a contended channel with a bandwidth being a first bandwidth to an access point, wherein the instruction information is used for instructing the access point to trigger the first station, or, trigger the first station and one or more other stations to perform uplink transmission, and the instruction information comprises at least one of: information for instructing whether to allow the access point to trigger the first station and one or more other stations to perform uplink transmission; information concerning the size of bandwidth resources that need to be occupied by the first station for subsequent uplink transmission; information concerning the position of bandwidth resources that need to be occupied by the first station for subsequent uplink transmission; and quality of service (QoS) parameter information of the first station.

Alternatively, the storage medium is further configured to store program code for executing the following step:

S1, the first station receiving the radio frame carrying trigger information sent by the access point, wherein the radio frame carrying the trigger information is used for indicating the channel allocated by the access point to the first station; and the first station performs uplink transmission on the channel allocated by the access point to the first station.

Alternatively, the storage medium is further configured to store program code for executing the following step:

S2: the first station performing channel detection, and selecting, according to the channel sense result, the position of bandwidth resources that need to be occupied for subsequent uplink transmission.

Further provided in the embodiments of the present disclosure is another storage medium. Alternatively, in the present embodiment, the abovementioned storage medium may be configured to store program code for performing the following steps:

S1: An access point receiving a radio frame carrying instruction information sent by a first station on a contended channel with a bandwidth being a first bandwidth;

S2: the access point triggering the first station to perform uplink transmission according to the instruction information, or triggering the first station and one or more other stations to perform uplink transmission.

Alternatively, the storage medium is further configured to store program code for executing one of the following steps:

S1: the access point performing channel detection and selecting, according to the channel sense result, a bandwidth size and/or a bandwidth resource location for uplink transmission of the first station;

S2: the access point performing channel detection and selecting, according to the channel sense result, a bandwidth size and/or a bandwidth resource location for the first station and one or more other stations to perform uplink transmission.

Further provided in the embodiments of the present disclosure is another storage medium. Alternatively, in the present embodiment, the abovementioned storage medium may be configured to store program code for performing the following steps:

S1, one or more stations receiving a radio frame carrying trigger information sent by an access point, the radio frame carrying the trigger information being used for triggering the one or more stations to perform uplink transmission, wherein the one or more stations are stations other than the first station;

S2, the one or more stations ignoring the NAV configured by the first station and performing uplink transmission according to the radio frame.

Alternatively, the storage medium is further configured to store program code for executing the following step:

S1, if the one or more stations, for which the first station has configured the NAV, obtain random access resource information, and are allowed to access on the random access resources, the one or more stations ignore the NAV configured by the first station and contend for access on the random access resources.

Alternatively, in the embodiment, the storage medium may comprise, but not limited to, a variety of media that can store program code, such as a USB disk, a read-only memory (ROM), a random access memory (RAM), a mobile hard disk, a magnetic disc, an optical disc, etc.

Alternatively, in the present embodiment, the processor executes each execution step in the multi-station transmission instruction method according to the stored program code in the storage medium.

Alternatively, in the present embodiment, the processor executes each execution step in the multi-station transmission triggering method according to the stored program code in the storage medium.

Alternatively, in the present embodiment, the processor executes each execution step in the multi-station transmission execution method according to the stored program code in the storage medium.

Alternatively, for a specific example in the present embodiment, reference may be made to the examples described in the foregoing embodiments and alternative embodiments, and details thereof are not described herein again in the present embodiment.

Obviously, those skilled in the art should understand that respective modules or steps of the present disclosure described above can be implemented by a general computing device. They may be centralized on a single computing device or distributed on a network formed by multiple computing devices. Alternatively, they may be implemented with program code executable by a computing device, so that they may be stored in a storage device for execution by a computing device, and in some cases, may be executed in a different order from that shown or described herein, or they are made into individual integrated circuit modules respectively, or a plurality of modules or steps among them are made into a single integrated circuit module. As such, the present disclosure is not limited to any specific combination of hardware and software.

The foregoing descriptions are merely about preferred embodiments of the present disclosure and are not intended to limit the present disclosure. For those skilled in the art, the present disclosure may have various modifications and changes. Any modification, equivalent replacement, improvement, etc. within the spirit and principle of the present disclosure should be encompassed in the protection scope of the present disclosure.

INDUSTRIAL APPLICABILITY

According to the multi-station transmission instruction, transmission triggering, transmission execution method and device provided in the embodiments of the present disclosure, a first station sends a radio frame carrying instruction information on a contended channel with a bandwidth being a first bandwidth to an access point, wherein the instruction information is used for instructing the access point to trigger the first station or trigger the first station and one or more other stations to perform uplink transmission, to solve the problem in the related art that if some station obtains certain channel resources by contention but the station itself occupies only a part of the channel resources for transmission, as all the bandwidth resources obtained by contention have been claimed by the station for occupation, other stations are unable to contend for occupation, resulting in the waste of frequency resources. Further, the present disclosure effectively avoids the waste of air interface resources during large bandwidth transmission.

What is claimed is:

1. A multi-station transmission instruction method, comprising:
  under the condition that a first station and one or more other stations are to perform multi-station uplink transmission, sending, by the first station, a first radio frame carrying instruction information on a channel with a first bandwidth achieved through contention to an access point,
  wherein the instruction information is used for instructing the access point to trigger the first station and the one or more other stations to perform uplink transmission;
  wherein the instruction information comprises at least one of:
    information for instructing whether to allow the access point to trigger the first station and one or more other stations to perform uplink transmission;

information concerning the size of bandwidth resources that need to be occupied by the first station for subsequent uplink transmission;

information concerning the position of bandwidth resources that need to be occupied by the first station for subsequent uplink transmission;

quality of service (QoS) parameter information of the first station, wherein after sending, by the first station, the first radio frame carrying the instruction information to the access point, the method further comprises:

receiving, by the first station, a second radio frame carrying trigger information sent by the access point; wherein the second radio frame carrying the trigger information is used for indicating information of a bandwidth resource allocated by the access point to the first station, and indicating information of a bandwidth resource allocated by the access point to the one or more other stations to perform the uplink transmission; and performing, by the first station, the uplink transmission using the bandwidth resource allocated by the access point to the first station.

2. The transmission instruction method according to claim 1, before the first station sends the first radio frame, further comprising:

the first station performing channel detection, and selecting, according to a channel detection result, the position of bandwidth resources that need to be occupied for subsequent uplink transmission.

3. The transmission instruction method according to claim 1, wherein, the information concerning the size of bandwidth resources is used for indicating a first part of the first bandwidth; and/or the information concerning the position of bandwidth resources is used for indicating the position of a channel with a bandwidth being the first part of the first bandwidth.

4. The transmission instruction method according to claim 1, wherein, the length of time, during which the first station and the one or more other stations perform uplink transmission, is less than or equal to the length of the transmission time that the first station has contended for.

5. The transmission instruction method according to claim 1, wherein, the QoS parameter information comprises at least one of:

data buffer status information of the first station;

maximum or minimum length information of a data packet that is allowed to be transmitted by the first station;

a minimum guaranteed bit rate of the first station;

minimum modulation and coding scheme (MCS) rate requirements of the first station.

6. A multi-station transmission triggering method, comprising:

under the condition that a first station and one or more other stations are to perform multi-station uplink transmission, receiving, by an access point, a first radio frame carrying instruction information sent by a first station on a channel with a first bandwidth achieved through contention;

triggering, by the access point, the first station and one or more other stations to perform uplink transmission according to the instruction information, wherein the triggering, by the access point, the first station and one or more other stations to perform uplink transmission according to the instruction information, comprises:

sending, by the access point, a second radio frame carrying trigger information to the first station; wherein the second radio frame carrying the trigger information is used for indicating information of a bandwidth resource allocated by the access point to the first station, and indicating information of a bandwidth resource allocated by the access point to the one or more other stations to perform the uplink transmission; and wherein the instruction information comprises at least one of:

information for instructing whether to allow the access point to trigger the first station and one or more other stations to perform uplink transmission;

information concerning the size of bandwidth resources that need to be occupied by the first station for subsequent uplink transmission;

information concerning the position of bandwidth resources that need to be occupied by the first station for subsequent uplink transmission; and quality of service (QoS) parameter information of the first station.

7. The multi-station transmission triggering method according to claim 6, wherein, the QoS parameter information comprises at least one of:

data buffer status information of the first station;

maximum or minimum length information of a data packet that is allowed to be transmitted by the first station;

a minimum guaranteed bit rate of the first station;

minimum modulation and coding scheme (MCS) rate requirements of the first station.

8. The multi-station transmission triggering method according to claim 7, wherein, when the QoS parameter information comprises at least one of data buffer status information of a station, maximum or minimum length information of a data packet that is allowed to be transmitted by the station, a minimum guaranteed bit rate of the station, and minimum MCS rate requirements of the station, the access point allocates, according to the QoS parameter information, a bandwidth size and/or a bandwidth resource location to the first station for uplink transmission.

9. The multi-station transmission triggering method according to claim 6, before the access point triggers the first station and the one or more other stations to perform uplink transmission according to the instruction information, further comprising one of:

the access point performing channel detection and selecting, according to a channel detection result, a bandwidth size and/or a bandwidth resource location for uplink transmission of the first station;

the access point performing channel detection and selecting, according to the channel detection result, a bandwidth size and/or a bandwidth resource location for the first station and the one or more other stations to perform uplink transmission.

10. The multi-station transmission triggering method according to claim 6, wherein, by sending the second radio frame carrying the trigger information according to the instruction information, the access point triggers the first station and one or more other stations to perform uplink transmission, wherein the transmission bandwidth of the second radio frame carrying the trigger information is greater than, equal to or less than the first bandwidth.

11. The multi-station transmission triggering method according to claim 6, wherein, when the instruction information carries information of whether to allow the access point to trigger the first station and the one or more other stations to perform uplink transmission; and if the information indicates that the access point is allowed, the access point triggers the first station and the one or more other stations to perform uplink transmission;

if the information indicates that the access point is not allowed, the access point allocates, according to the parameter information set of the sending first station, a bandwidth size and/or a bandwidth resource location to the first station for uplink transmission, wherein the parameter information set comprises at least one of: bandwidth resource size, bandwidth resource location, QoS parameter information.

12. The multi-station transmission triggering method according to claim 6, wherein, when the instruction information carries information of whether to allow the access point to trigger the first station and the one or more other stations to perform uplink transmission, if the information indicates that the access point is not allowed and the instruction information does not carry the parameter information set of the first station, the access point allocates, according to a channel detection result, a bandwidth size and/or a bandwidth resource location to the first station for uplink transmission, wherein the parameter information set comprises at least one of: bandwidth resource size, bandwidth resource location, QoS parameter information.

13. The multi-station transmission triggering method according to claim 12, wherein, the access point selects a bandwidth size and/or a bandwidth resource location for the first station according to a channel detection result of the first radio frame carrying the instruction information.

14. The multi-station transmission triggering method according to claim 6, wherein, when the instruction information does not carry the information of whether to allow the access point to trigger the first station and the one or more other stations to perform uplink transmission, the access point triggers the first station and the one or more other stations to perform uplink transmission.

15. The multi-station transmission triggering method according to claim 6, wherein, when the instruction information carries the information concerning the size of bandwidth resources that need to be occupied by the first station for subsequent uplink transmission, the access point allocates at least the transmission bandwidth corresponding to the bandwidth resource size information to the first station.

16. The multi-station transmission triggering method according to claim 6, wherein, when the instruction information carries the information concerning the position of bandwidth resources that need to be occupied by the first station for subsequent uplink transmission, the access point allocates at least bandwidth resources corresponding to the bandwidth resource location information to the first station.

17. The multi-station transmission triggering method according to claim 6, wherein, the length of time, during which the first station and the one or more other stations perform uplink transmission, is less than or equal to the length of the transmission time that the first station has contended for.

18. A multi-station transmission instruction device, the device being applied to a first station and comprising:
    a processor; and
    a memory configured to store instructions executable by the processor;
    wherein the processor is configured to send a first radio frame carrying instruction information on a channel with a first bandwidth achieved through contention to an access point under the condition that a first station and one or more other stations are to perform multi-station uplink transmission, wherein the instruction information is used for instructing the access point to trigger the first station and one or more other stations to perform uplink transmission, the instruction information comprises at least one of:
    information for instructing whether to allow the access point to trigger the first station and one or more other stations to perform uplink transmission;
    information concerning the size of bandwidth resources that need to be occupied by the first station for subsequent uplink transmission;
    information concerning the position of bandwidth resources that need to be occupied by the first station for subsequent uplink transmission; and
    QoS parameter information of the first station,
    receive a second radio frame carrying trigger information sent by the access point; wherein the second radio frame carrying the trigger information is used for indicating information of a bandwidth resource allocated by the access point to the first station, and indicating information of a bandwidth resource allocated by the access point to the one or more other stations to perform the uplink transmission; and
    perform the uplink transmission using the bandwidth resource allocated by the access point to the first station.

19. A multi-station transmission triggering device, the device being applied to an access point and comprising:
    a processor; and
    a memory configured to store instructions executable by the processor;
    wherein the processor is configured to:
        receive a first radio frame carrying instruction information sent by a first station on a channel with a bandwidth being the first bandwidth achieved through contention under the condition that a first station and one or more other stations are to perform multi-station uplink transmission;
        according to the instruction information, trigger the first station and one or more other stations to perform uplink transmission,
    wherein the processor is further configured to:
        send a second radio frame carrying trigger information to the first station; wherein the radio frame carrying the second trigger information is used for indicating information of a bandwidth resource allocated by the access point to the first station, and indicating information of a bandwidth resource allocated by the access point to the one or more other stations to perform the uplink transmission; and
    wherein the instruction information comprises at least one of:
        information for instructing whether to allow the access point to trigger the first station and one or more other stations to perform uplink transmission;
        information concerning the size of bandwidth resources that need to be occupied by the first station for subsequent uplink transmission;
        information concerning the position of bandwidth resources that need to be occupied by the first station for subsequent uplink transmission; and
        quality of service (QoS) parameter information of the first station.

20. A computer readable storage medium storing computer executable instructions for executing the multi-station transmission instruction method of claim 1.

21. A computer readable storage medium storing computer executable instructions for executing the multi-station transmission triggering method of claim 6.

* * * * *